US005700018A

United States Patent [19]

Bongers-Ambrosius et al.

[11] Patent Number: 5,700,018

[45] Date of Patent: Dec. 23, 1997

[54] TOOL BIT CHUCK

[75] Inventors: Hans-Werner Bongers-Ambrosius, Iffeldorf; Jörg Eichhorn, München, both of Germany

[73] Assignee: Hilti Aktiengesellschaft, Fürstentum, Liechtenstein

[21] Appl. No.: 724,809

[22] Filed: Oct. 2, 1996

[30] Foreign Application Priority Data

Oct. 9, 1995 [DE] Germany ........................ 195 37 560.2

[51] Int. Cl.$^{6}$ .......................... B23B 31/107; B23B 45/16

[52] U.S. Cl. ............................ 279/19.4; 279/75; 408/226

[58] Field of Search ............................ 279/19, 19.3–19.5, 279/74, 75, 904, 905; 408/226

[56] References Cited

FOREIGN PATENT DOCUMENTS

| | | | |
|---|---|---|---|
| 0223738 | 5/1987 | European Pat. Off. . | |
| 2834991 | 2/1980 | Germany . | |
| 3328886 | 2/1984 | Germany . | |
| 3714679 | 11/1988 | Germany . | |
| 4341969 | 6/1995 | Germany . | |
| 985274 | 1/1983 | U.S.S.R. | 279/19.4 |
| 1010262 | 4/1983 | U.S.S.R. | 279/19.3 |
| 1488426 | 6/1989 | U.S.S.R. | 175/414 |

*Primary Examiner*—Steven C. Bishop
*Attorney, Agent, or Firm*—Anderson Kill & Olick, P.C.

[57] ABSTRACT

A tool bit chuck for a bit (1) having axially extending latching grooves (2) closed at the opposite ends spaced apart in the axial direction, and axially extending rotary entrainment grooves (3) open at the trailing end of the bit. The chuck has entrainment elements (8) and radially displaceable latching elements (8). The latching elements (4) provide axially directed retention of the bit (1), while the entrainment elements (8) transmit torque to the bit (1). The entrainment elements are shaped as roll bodies, such as cylinders, to prevent wear caused by friction.

3 Claims, 1 Drawing Sheet

TOOL BIT CHUCK

BACKGROUND OF THE INVENTION

The present invention is directed to a tool bit chuck for bits having at least one axially extending latching groove and at least one rotary entrainment groove open at the trailing end of the bit. At least one latching element for the latching groove is supported so that it can be radially displaced and at least one entrainment element is provided for the rotary entrainment groove, and both are arranged in a receiving sleeve in the chuck.

A tool bit chuck for a manually operable drilling tool is known from DE-PS 25 51 125, where the bits can be inserted into the chuck and contain two axially extending latching grooves with closed ends and two rotary entrainment grooves open at the trailing end of the bit. The manually operable tools discussed here are basically hammerdrills, multi-purpose hammers and chippers. Such manually operable tools transmit both a rotary as well as a striking or percussion motion to the bits such as drills or chisels inserted into the tool bit chuck. Accordingly, the tool bit chuck must be arranged so that it is able to transmit torque to the bit while holding the bit, so that it is axially displaceable but does not drop out of the chuck.

To satisfy such requirements, the known tool bit chuck has radially displaceable latching elements for axial retention of the bit and the latching elements are located in a receiving sleeve formed in the chuck. The latching elements engage in the latching grooves closed at their ends. In the presently known tool, two diametrically opposite latching elements are formed as balls. Since the axial length of the latching grooves exceeds that of the latching elements, the limited axial displaceability of the bits with the rolling motion of the balls in the latching grooves is assured.

Entrainment elements, for instance, two strips located opposite one another, are provided in the receiving sleeve for transmitting torque. These entrainment elements engage into the rotary entrainment grooves in the bit which are open at the trailing end thereof.

It is necessary that the bits are supported in the tool bit chuck so that they can be displaced axially to a limited extent, especially due to the striking or percussion motion provided in the manually operated tools for striking the bits, as has been previously pointed out. In operation there is a continuous shift between the bit and the tool bit chuck, since the entrainment elements governing the transmittal of torque are part of the receiving sleeve, a relative shift between the bit and the entrainment elements takes place so that torque acts on the entrainment elements. Therefore, an extraordinarily high friction is developed at the surface between the entrainment elements and the bit causing high wear in the entrainment elements as well as in the bit. Consequently, the premature failure of the bit occurs as well as disproportionately high wear of the tool bit chuck.

SUMMARY OF THE INVENTION

Therefore, it is the primary object of the present invention to provide a tool bit chuck for manually operable tools, of the type described above, so that harmful wear of the bit and the chuck can be avoided.

In accordance with the present invention, the entrainment element is formed of at least one roll body rolling along a plane extending parallel to the axis of the receiving sleeve. Transmission of the torque is provided by an entrainment element, shaped as a roll body, whereby any friction during the relative shift between the bit and the chuck, leading to wear, is avoided. Accordingly, detrimental wear due to friction at the bit and the chuck does not occur.

In particular, with regard to the transmission of higher torques, it is advantageous to arrange several roll bodies consecutively along a plane extending parallel to the receiving sleeve. The number of roll bodies provided is determined by the dimensions of the bit and of the tool bit chuck. The roll bodies can be loosely received in the receiving sleeve of the chuck or a cage can be provided for retaining the reciprocal spacing order of the roll bodies, as is well known from ball and roller bearings.

Tool bits are widely available having two diametrically opposite entrainment grooves with two rotary entrainment elements formed by at least one roll body, with the entrainment elements located basically diametrically opposite one another. In such an arrangement, the entrainment elements can be formed as one or several consecutively disposed roll bodies. Such roll bodies can be shaped as balls independently of whether one or several consecutively arranged roll bodies are used. Shaping the roll bodies as cylinders appears to be especially desirable, if higher torques are to be transmitted. It is also possible to arrange several such roll bodies, formed as cylinders, in a consecutive arrangement.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
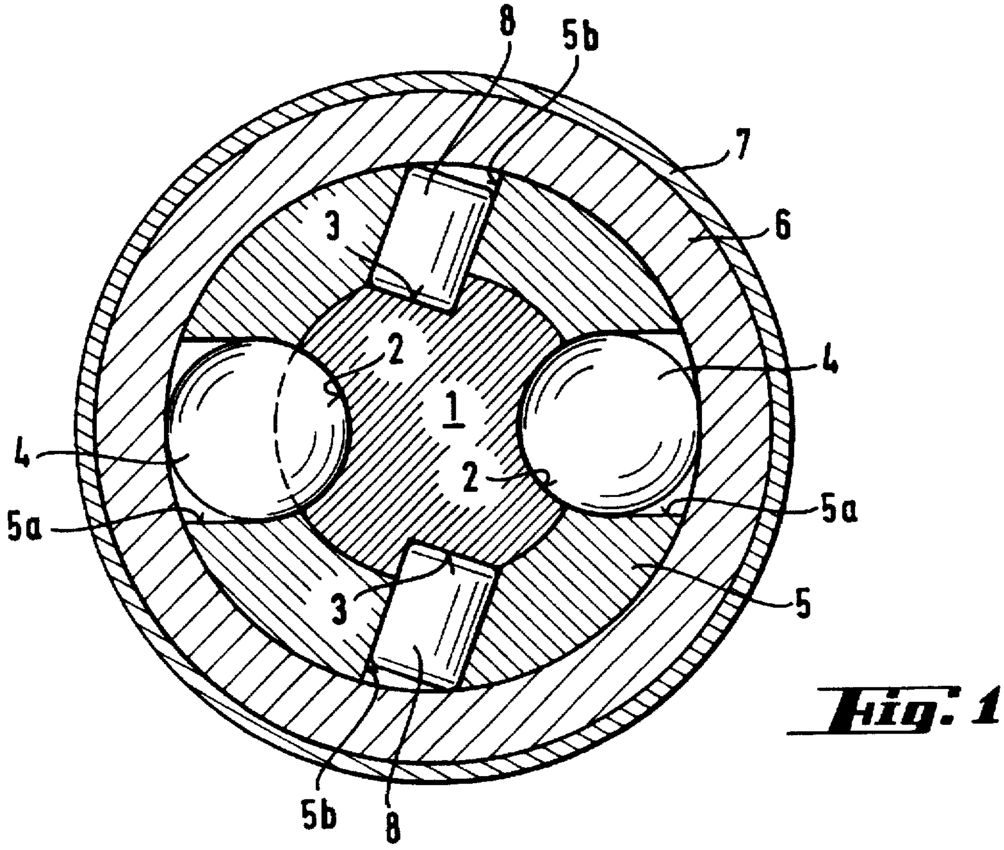
FIG. 1 is a diagrammatic sectional view showing a tool bit chuck having cylinders for the entrainment elements and embodying the present invention.

In FIG. 1, a bit 1 is inserted into a tool bit chuck with latching grooves 2, closed at the ends thereof spaced apart in the axial direction of the grooves, and located diametrically opposite one another, and two rotary entrainment grooves 3 open at the trailing end of the bit and also located diametrically opposite one another.

Latching elements 4, in the form of balls, serve for retaining the bit in the axial direction and the balls are disposed in a receiving sleeve 5 so that they can be displaced radially. Recesses can be located in the radial projection area of the latching elements, for instance, by an actuation ring or cage 6 encircling the receiving sleeve and, in turn, enclosed by a cage 7, so that by properly positioning the actuation cage 6, the latching elements located within openings 5*a* in the receiving sleeve 5 can be shifted radially outwardly from the latching grooves 2.

Entrainment elements 8, in the form of cylinders, are supported in recesses 5*b* in the receiving sleeve (5) and serve for transmitting torque. The entrainment elements engage into the rotary entrainment grooves 3 in the bit. Because the entrainment elements are formed as cylinders, no friction occurs at the areas where there is a transmission of torque, rather, the entrainment elements roll along the contacting areas.

Figure 2:
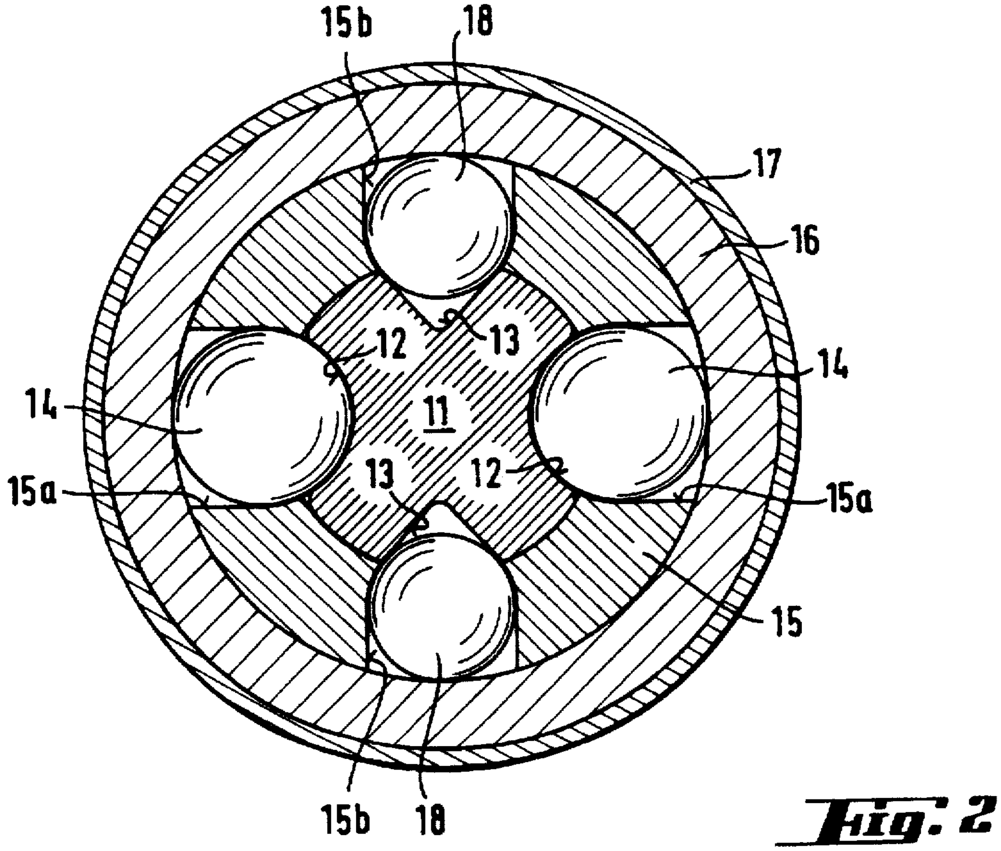
FIG. 2 is a diagrammatic sectional view, similar to FIG. 1 showing a tool bit chuck with the entrainment element roll bodies in the form of balls.

In FIG. 2, a bit 11 is shown inserted into a tool bit chuck, and the bit has two latching grooves 12 with the ends spaced apart in the axial direction of the grooves being closed and the grooves are located diametrically opposite one another. Two entrainment grooves 13 are open at the trailing end of the bit and are also located diametrically opposite one another. Latching elements 14, in the form of balls, are supported in openings 15*a* in the receiving sleeve 15 so that they can be radially displaced inwardly for axially retaining the bit. Recesses, not shown, can be moved into the radially outwardly projected region of the latching elements 14 so that the latching elements can be displaced radially outwardly for removing the bit, for instance, by displacing an actuation sleeve 16 laterally enclosing the receiving sleeve 15, with the sleeve 16 being surrounded by a cage 17.

Entrainment elements 18, in the form of balls, are provided for transmitting torque to the bit 11. The entrainment elements 18 cooperate with the rotary entrainment grooves 13 open at the rear end of the bit. The entrainment elements 18 are supported in recesses 15*b* in the receiving sleeve 15.

Due to the rolling of the entrainment elements 15 in the regions involved in the transmission of the torque, friction is avoided and detrimental wear of the bit 11 as well as of parts of the chuck is prevented.

We claim:

1. A tool bit chuck for an axially extending bit (1, 11) having a trailing end, said bit comprises at least one axially extending latching groove (2, 12) closed at the ends thereof spaced apart in the axial direction, and at least one axially extending rotary entrainment groove (3, 13) open at the trailing end of said bit, at least one latching element (4, 14) for engagement in said at least one latching groove and being supported in an axially extending receiving sleeve (5, 15) for radial displacement relative to said latching groove, at least one rotary entrainment element (8, 18) engageable in said at least one rotary entrainment groove (3, 13) for transferring torque to said bit, and said at least one rotary entrainment element (8, 18) being formed as a cylindrically shaped roll body rollable along a plane extending parallel to the axis of said receiving sleeve.

2. A tool bit chuck, as set forth in claim 1, wherein several said rotary entrainment elements (8, 18) in the form of said cylindrically shaped roll bodies are disposed consecutively along a plane extending parallel to the axis of said receiving sleeve.

3. A tool bit chuck, as set forth in claim 1 or 2, wherein two of said rotary entrainment elements (8, 18) each formed by at least one cylindrically shaped roll body are located diametrically opposite one another.

* * * * *